US005754200A

United States Patent [19]

Minemoto et al.

[11] Patent Number: 5,754,200

[45] Date of Patent: May 19, 1998

[54] INK JET TYPE HEAD ASSEMBLY

[75] Inventors: Hitoshi Minemoto; Yoshihiro Hagiwara; Ryosuke Uematsu; Junichi Suetsugu; Kazuo Shima, all of Tokyo, Japan

[73] Assignee: NEC Corporation, Tokyo, Japan

[21] Appl. No.: 760,220

[22] Filed: Dec. 4, 1996

[30] Foreign Application Priority Data

Dec. 6, 1995 [JP] Japan .................................. 7-317694

[51] Int. Cl.$^6$ ................................................ G01D 15/16

[52] U.S. Cl. ........................................................ 347/55

[58] Field of Search ................................ 347/10, 20, 37, 347/48, 54, 55, 71, 84, 86, 89

[56] References Cited

U.S. PATENT DOCUMENTS

| | | | |
|---|---|---|---|
| 4,383,265 | 5/1983 | Kohashi | 347/55 |
| 4,396,925 | 8/1983 | Kohashi | 347/55 |
| 4,432,003 | 2/1984 | Barbero et al. | 347/55 |
| 4,459,053 | 7/1984 | Ceresa | 347/10 |
| 4,504,844 | 3/1985 | Ebi et al. | 347/55 |
| 4,536,776 | 8/1985 | Knirsch et al. | 347/55 |
| 4,575,737 | 3/1986 | Vermot-Gaud et al. | 347/46 |
| 5,001,496 | 3/1991 | Vermot-Gaud et al. | 347/55 |
| 5,477,249 | 12/1995 | Hotomi | 347/48 |

FOREIGN PATENT DOCUMENTS

WO9311866 6/1993 WIPO .

OTHER PUBLICATIONS

Patent Abstracts of Japan, vol. 010, No. 218 (M-503), Jul. 30, 1986.

*Primary Examiner*—Adolf Berhane
*Attorney, Agent, or Firm*—Sughrue, Mion, Zinn, Macpeak & Seas, PLLC

[57] ABSTRACT

In an ink jet type head assembly, a plurality of auxiliary electrodes alternate with a plurality of ejection electrodes. A voltage of the same polarity as charge deposited on toner particles is applied to two of the auxiliary electrodes adjoining an ejection electrode which should eject ink. This successfully prevents the toner particles from migrating toward the auxiliary electrodes away from the ejection electrode.

4 Claims, 7 Drawing Sheets

INK JET TYPE HEAD ASSEMBLY

BACKGROUND OF THE INVENTION

The present invention relates to an ink jet type head assembly and, more particularly, to an ink jet type head assembly of the type ejecting a mass or drop of toner particles contained in pigment-based by an electric field.

A printer of the type ejecting ink from a head so as to form an image on a recording medium is extensively used with a personal computer, word processor or similar data processing apparatus. However, the problem with a conventional ink jet type head assembly included in the printer is that it cannot eject drops of toner particles stably at all times.

SUMMARY OF THE INVENTION

It is therefore an object of the present invention to provide an ink jet type head assembly capable of ejecting toner particles contained in pigment-based ink in the form of drops stably at all times.

An ink jet type head assembly of the present invention includes an electrophoresis electrode and a counter electrode facing each other at a predetermined distance. An ink chamber has an ink outlet facing the counter electrode for forming ink meniscuses. A plurality of parallel ejection electrodes have their tips aligned in the lengthwise direction of the ink outlet. The ejection electrodes each at least partly extends in the form of a stripe along a line connecting the electrophoresis electrode and counter electrode. A plurality of auxiliary electrodes alternate with the ejection electrodes.

BRIEF DESCRIPTION OF THE DRAWINGS

The above and other objects, features and advantages of the present invention will become apparent from the following detailed description taken with the accompanying drawings in which.

In the figures, identical reference numerals designate identical structural elements.

DESCRIPTION OF THE PREFERRED EMBODIMENT

Figure 1:
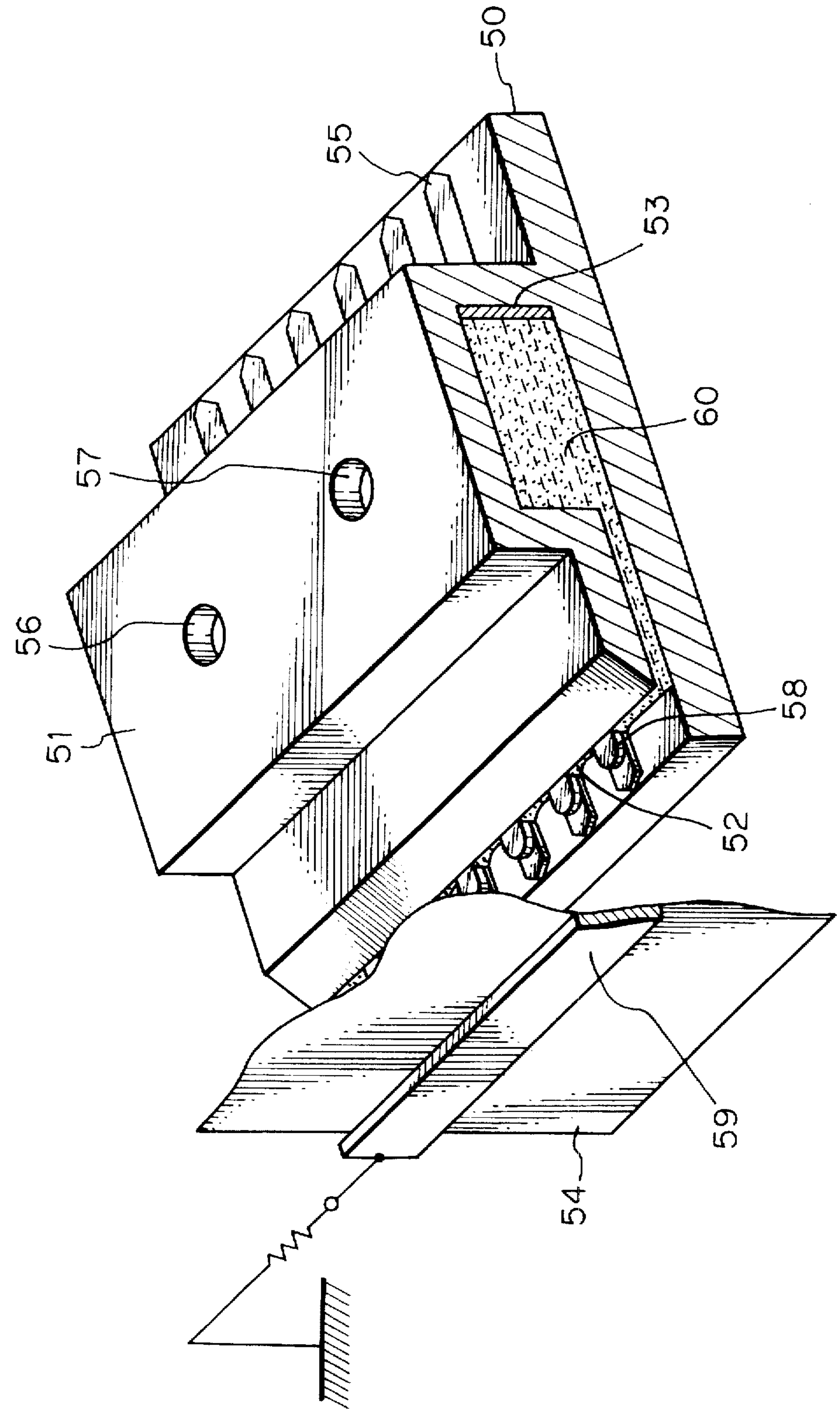
Fig. 1 PRIOR ART
FIG. 1 is a perspective view showing a conventional ink jet type head assembly.

To better understand the present invention, a brief reference will be made to a conventional ink jet type head assembly, shown in FIGS. 1 and 2. As shown, the head assembly includes a base 50 on which a plurality of elongate ejection electrodes 55 are arranged in parallel. An ink chamber 51 is formed on the surface of the base 50 where the ejection electrodes 55 are formed. The ink chamber 51 stores pigment-based ink therein. An ink outlet 52 is formed at one end of the ink chamber 51. A plurality of walls 58 are positioned in the ink outlet 52 and correspond in position to the ejection electrodes 55, partitioning the outlet 52 into a plurality of meniscus forming portions. A counter electrode 59 faces the ejection electrodes 55 with the intermediary of a recording medium 54. The counter electrode 59 is connected to ground via a preselected resistance, as illustrated. An electrophoresis electrode 53 is provided on the inner wall of the ink chamber 51 opposite to the ink outlet 52 and held in contact with the ink 60. An inlet port 56 and an outlet port 57 are formed through the top wall of the ink chamber 51 in order to circulate the ink 60.

The base 50 is formed of glass or similar material. The ejection electrodes 55 are formed of Cu, Ni or similar material and patterned on the base 50. The ejection electrodes 55 are arranged at a pitch of about 85 μm. The member enclosing the ink chamber 51 and the walls 58 are formed of a dielectric material. Both the electrophoresis electrode 53 and counter electrode 59 are formed of a conductive material. The electrophoresis electrode 54 is insulated from the ejection electrodes 55. The ink 60 consists of a petroleum-based organic solvent (isoparaffin) and a charge control agent and toner dispersed in the solvent. Toner refers to fine colored particles of thermoplastic resin.

The toner is apparently charged to the positive polarity by zeta potential. The recording medium 54 may be implemented as plain paper. The inlet port 56 and outlet port 57 are communicated to an ink reservoir by a tubing including a pump, although not shown specifically. In this condition, vacuum is generated in the ink chamber 51, and the ink 60 is forcibly circulated. Means, not shown, for applying a bias voltage VI to the electrophoresis electrode 53 is associated with the electrode 53. The bias voltage VI is identical in polarity as the charge deposited on the toner particles.

Figure 2:
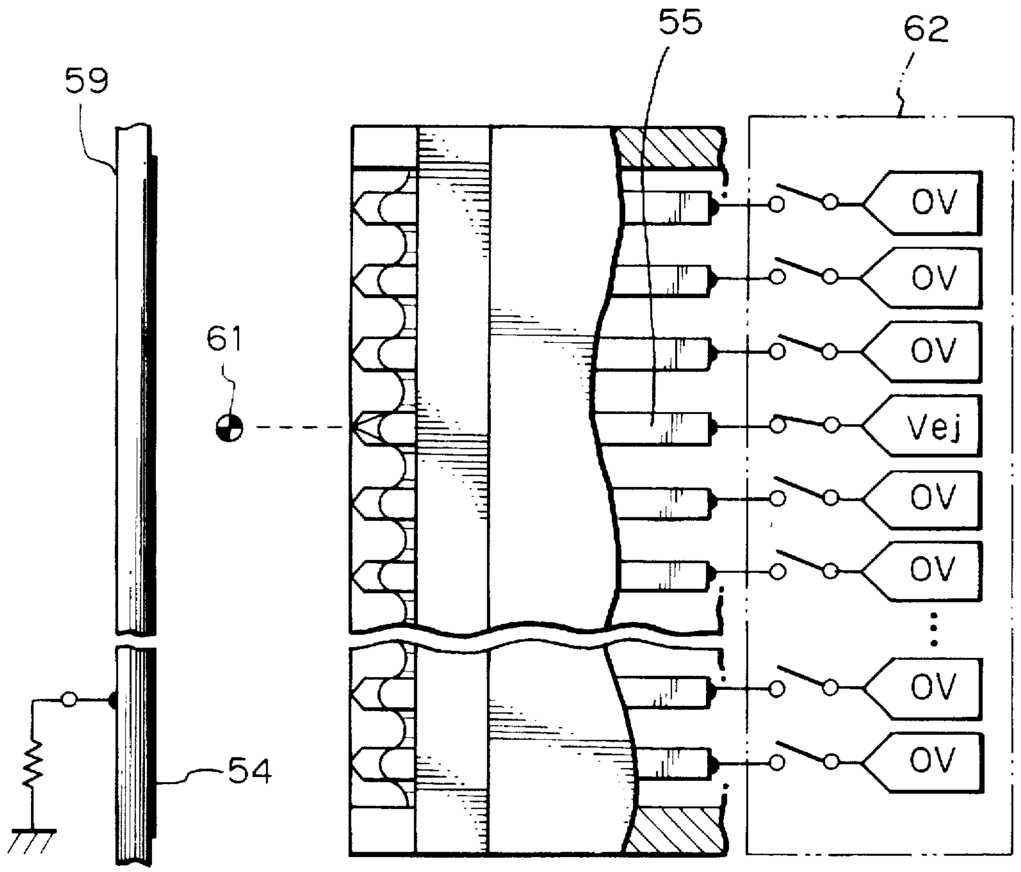
Fig. 2 PRIOR ART
FIG. 2 shows an electric arrangement included in the conventional head assembly.

As shown in FIG. 2, the ejection electrodes 55 are connected to a voltage drive section 62. The voltage drive section 62 selectively applies a voltage Vej in the form of a pulse to the ejection electrodes 55 which should eject the ink 60.

Figure 3:
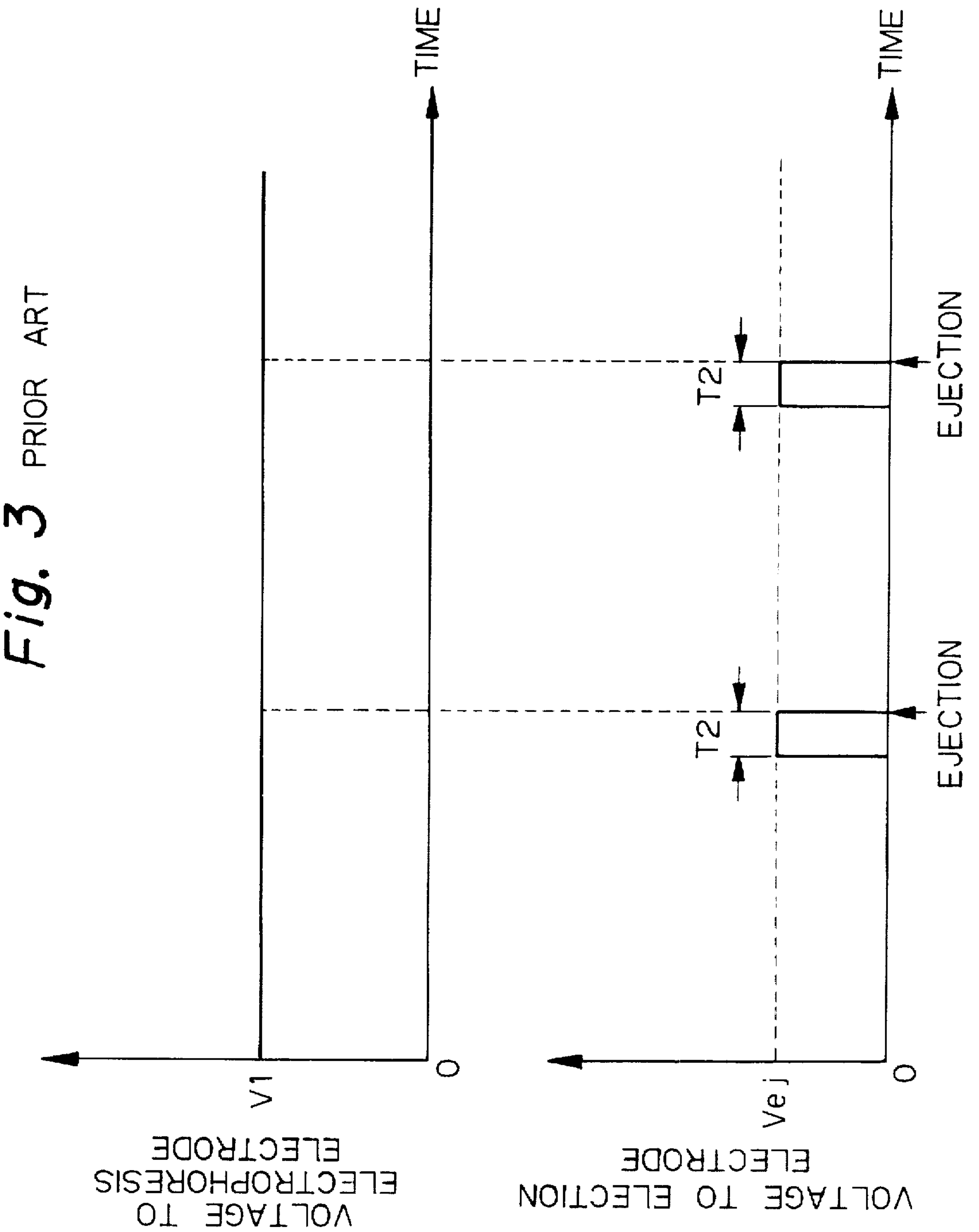
Fig. 3 PRIOR ART
FIG. 3 shows a voltage applied to an electrophoresis electrode and and a voltage applied to an ejection electrode in the conventional head assembly.

FIG. 3 demonstrates the operation of the above head assembly. As shown, when the entire head assembly is rendered operative, the bias voltage VI of the same polarity as the charge deposited on the toner particles is applied to the electrophoresis electrode 53. The resulting electric field causes the toner particles to migrate due to electrophoresis and collect densely in the ink outlet 52. As a result, convex meniscuses are formed at the ends of the walls 58.

Subsequently, the ejection voltage Vej is applied to the ejection electrode 55 which should eject the ink 60. In response, the toner particles collect more density at the tip of the ink meniscus formed at the end of the wall 58 associated with the above electrode 55. When the electrostatic force acting on such a dense mass of toner particles overcomes the surface tension of the ink meniscus, the mass is ejected toward the counter electrode 59 in the form of a drop 61 (see FIG. 2). The drop 61 deposits on the recording medium 54 and forms a dot thereon.

Figure 4:
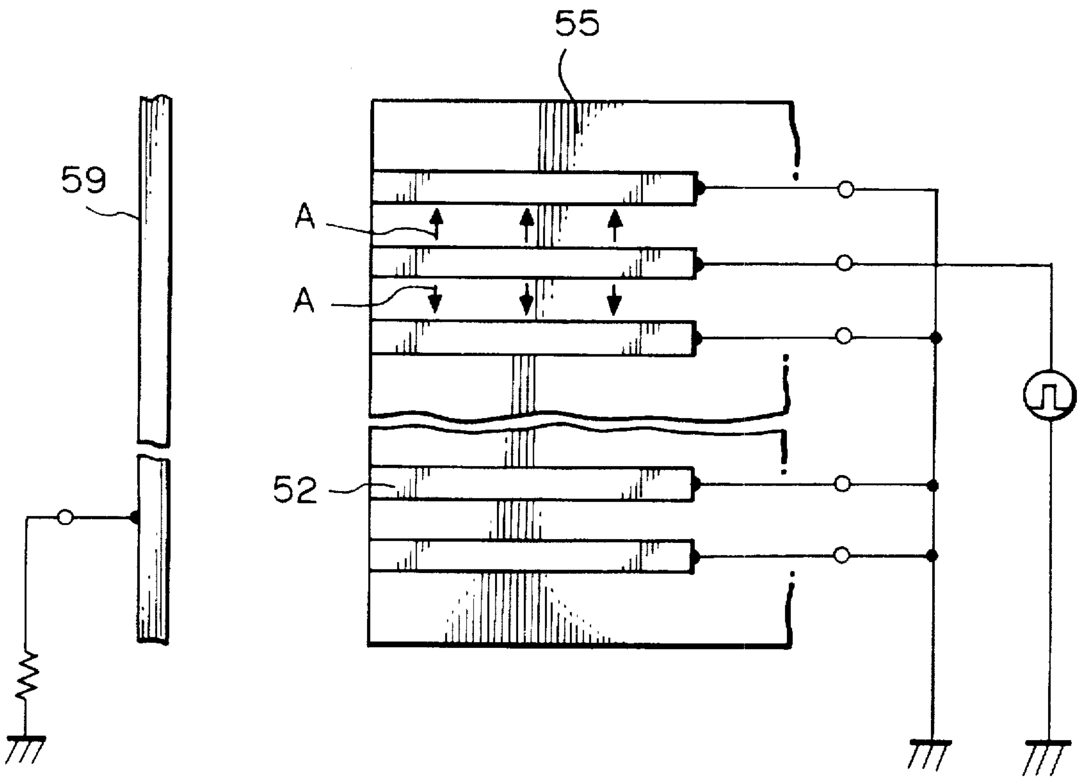
Fig. 4 PRIOR ART
FIG. 4 is a view useful for understanding the problem of the conventional head assembly.

The conventional head assembly described above has the following problem left unsolved. As shown in FIG. 4, when the ejection voltage Vej is applied to the ejection electrode 55 to eject the ink 60, the resulting electric field causes the toner particles collected densely around the electrode 55 to leave the electrode 55 in directions indicated by arrows A.

Consequently, when a given electrode 55 is driven continuously, the toner particles cannot sufficiently center around the meniscus formed by the electrode 55. This will prevent the drop 61 from being ejected in due course of time.

Figure 5:
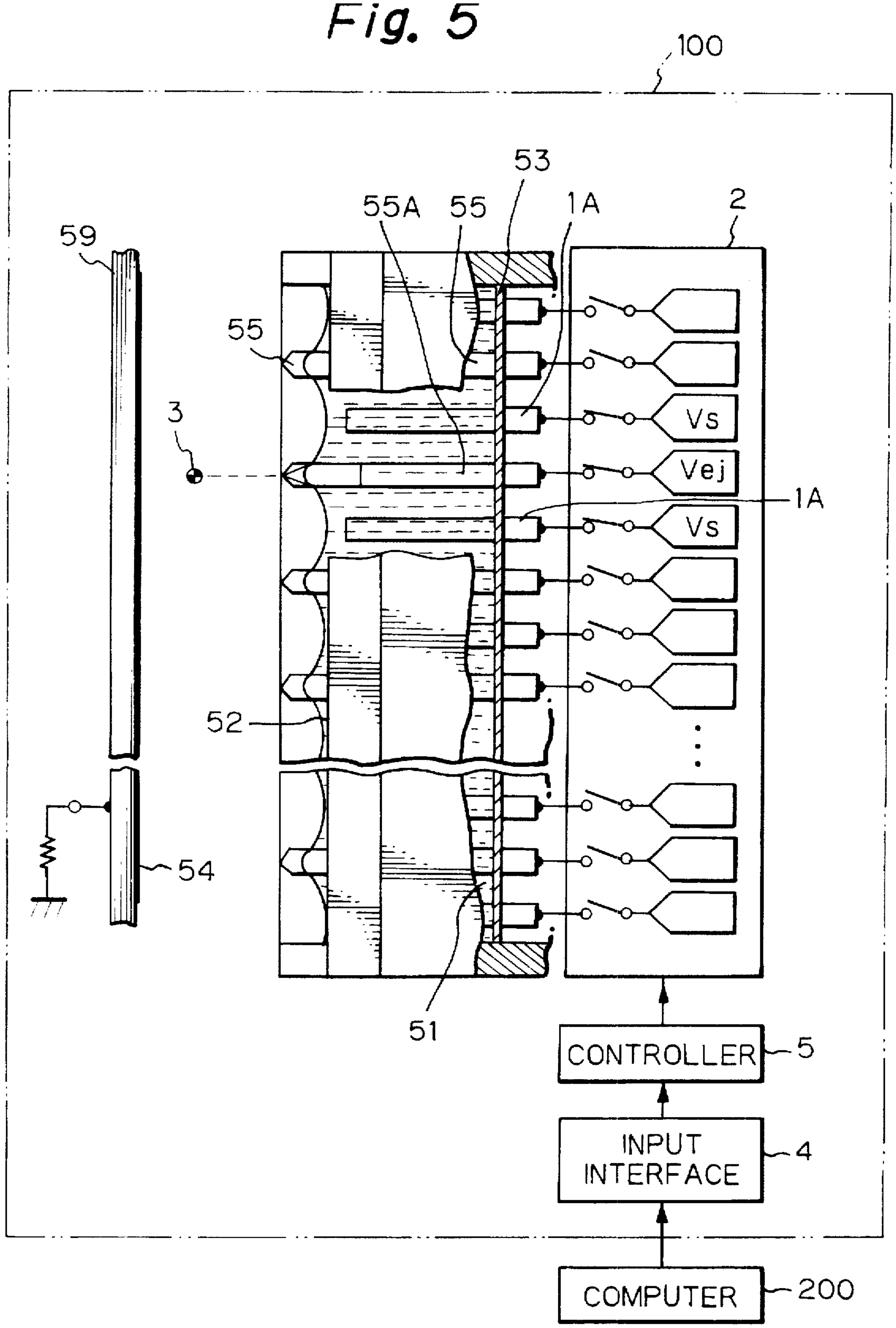
FIG. 5 shows an ink jet type head assembly embodying the present invention.
Figure 6A:
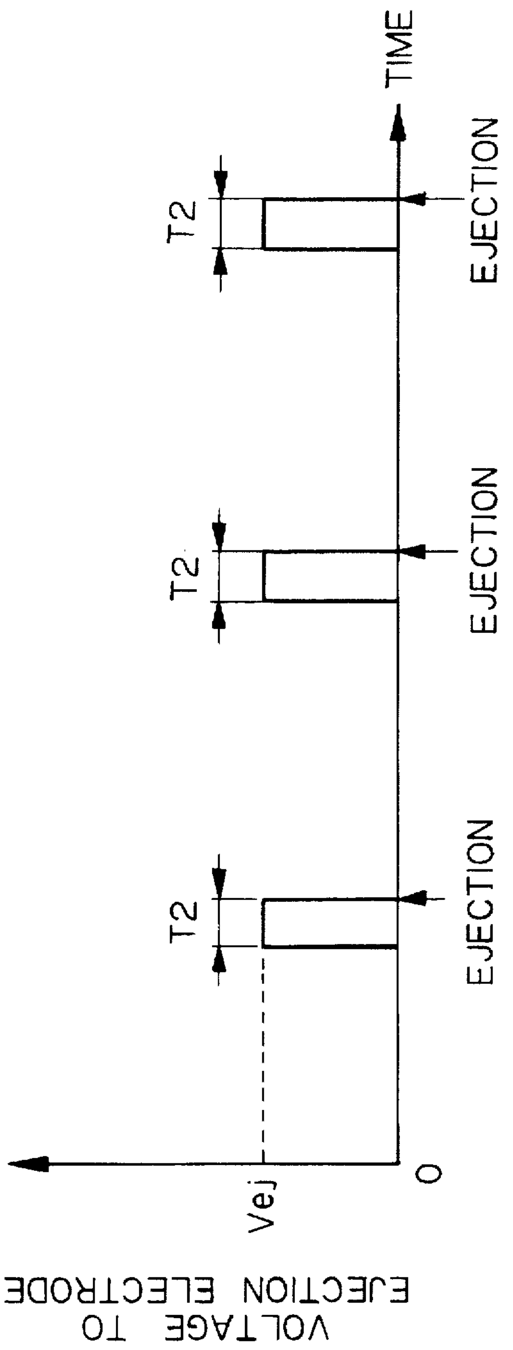
FIGS. 6A and 6B respectively show an ejection voltage applied to an ejection electrode included in the embodiment and an auxiliary voltage applied to an auxiliary electrode also included in the embodiment.
Figure 6B:
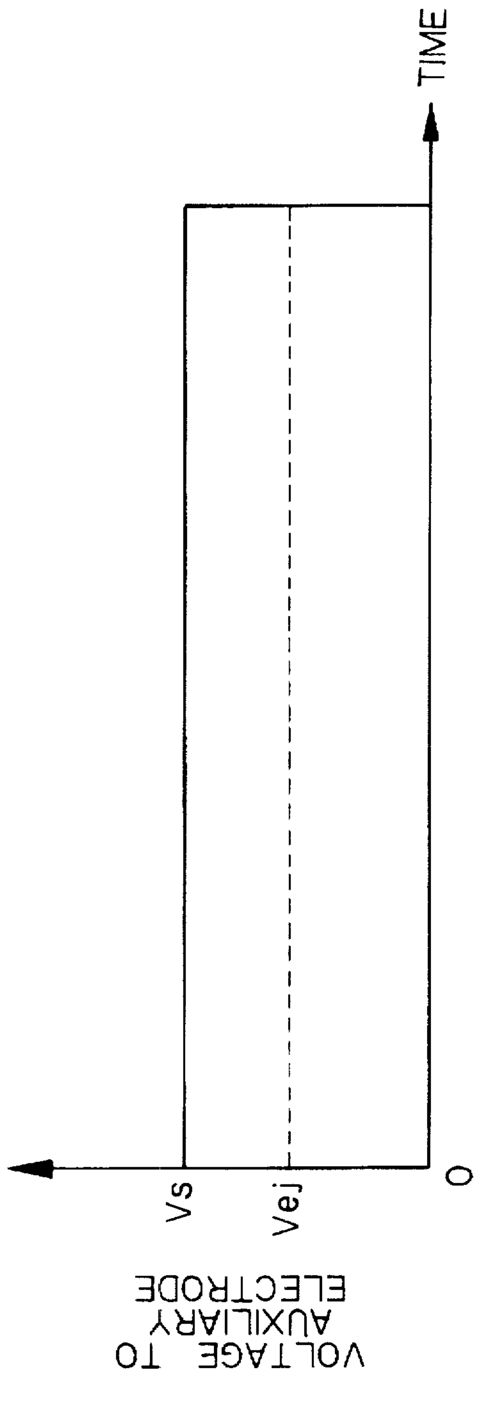
Figure 7:
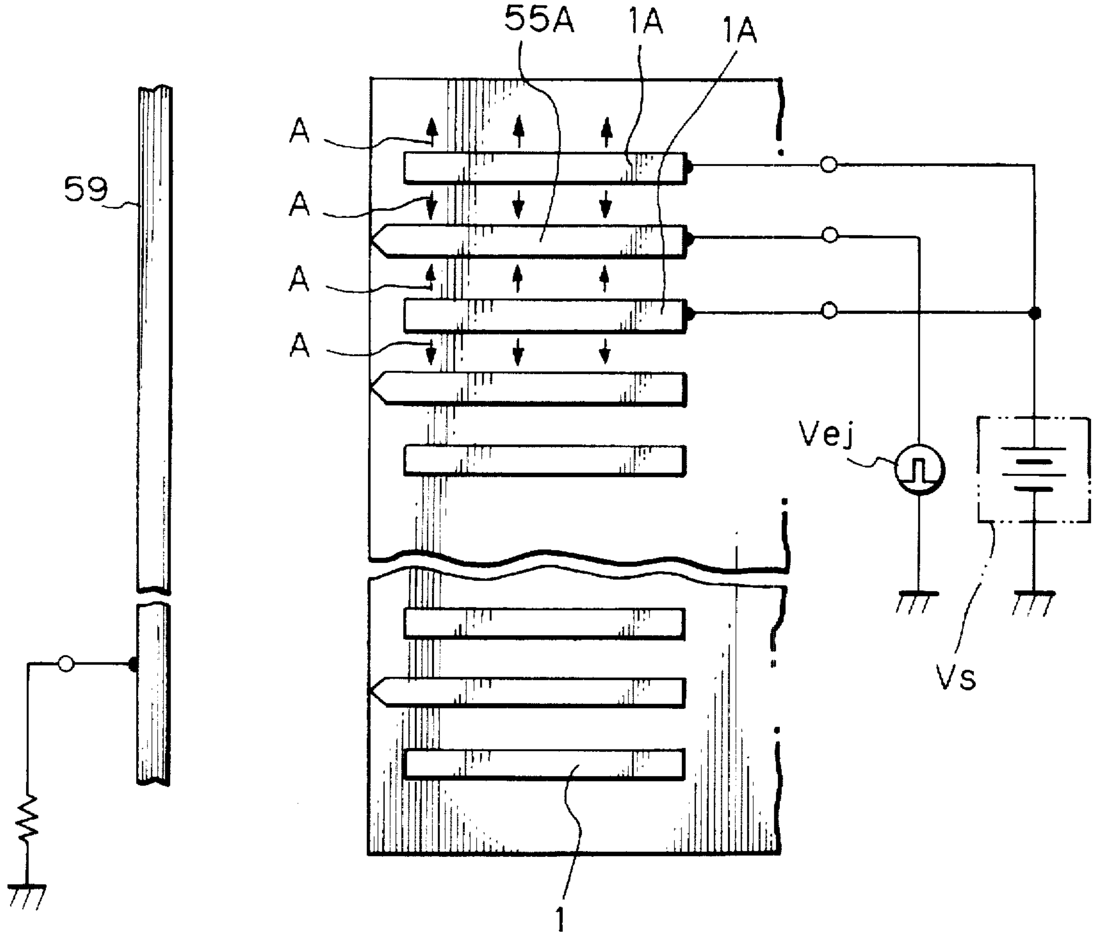
FIG. 7 shows the directions of electric fields formed by the ejection voltage and auxiliary voltage shown in FIGS. 6A and 6B.

Referring to FIGS. 5–7, an ink jet type head assembly embodying the present invention will be described. As shown, the head assembly, generally 100, includes an electrophoresis electrode 53 and a counter electrode 59 spaced at a predetermined distance from each other. An ink chamber 51 is formed between the two electrodes 53 and 59 and stores pigment-based ink containing charged toner particles. An ink outlet 52 is formed at one end of the ink chamber 51 facing the counter electrode 59 so as to form ink meniscuses. A plurality of elongate ejection electrodes 55 are arranged in parallel with their tips aligning in the lengthwise direction of the ink outlet 52. Each ejection electrode 55 extends along a line connecting the electrophoresis electrode 54 and counter electrode 59. A plurality of elongate auxiliary electrodes 1 alternate with the ejection electrodes 55.

In the illustrative embodiment, the tips of the auxiliary electrodes 1 facing the counter electrode 59 are located at positions receded from the tips of the ejection electrodes 55 into the ink chamber 51. A voltage drive section 2 applies an ejection electrode Vej to the ejection electrode 55 to eject the ink, and applies an auxiliary voltage Vs to two auxiliary electrodes 1 adjoining the electrode 55. The auxiliary voltage Vs is selected to be higher than the ejection voltage Vej.

More specifically, the tips of the auxiliary electrodes 1 facing the counter electrode 59 are disposed in the ink chamber 51. The auxiliary electrodes 1 are located at the outside of the outermost ejection electrodes 55 also. Print data are fed from a computer or host 200 to a controller 5 via an input interface 4. The controller 5 sets and controls the voltage to be applied to the individual ejection electrode 5 on the basis of the print data. The rest of the construction is identical with the conventional head assembly.

The head assembly 100 will be operated as follows. As shown in FIG. 3, the constant voltage V1 is applied to the electrophoresis electrode 53 in order to form an electric field in the ink chamber 51. The electric field causes the toner particles contained in the ink to migrate toward the ink outlet 52 at a preselected electrophoresis speed. As a result, a convex ink meniscus is formed at the tip of each ejection electrode 55.

The controller 5 determines, in response to print data and a print control signal received from the computer 200 via the interface 4, one ejection electrode 55A to which the ejection voltage Vej should be applied and auxiliary electrodes 1A to which the auxiliary voltage Vs should be applied. Then, the controller 5 sends a control signal to the voltage drive section 2. As shown in FIGS. 6A and 6B, on receiving the control signal, the voltage drive section 2 applies to the designated ejection electrode 55A the voltage Vej whose duration is T2, and applies the voltage Vs to the auxiliary electrodes 1A adjoining the electrode 55A. The voltage Vs is higher than the voltage Vej, as stated earlier and shown in FIG. 6B.

The ejection voltage Vej causes the toner particles to collect density at the tip of the above ejection electrode 55A.

When the toner particles overcomes the meniscus and the surface tension and viscosity of the ink, they fly from the tip of the electrode 55A in the form of a fine drop 3 in synchronism with the pulse voltage Vej. The drop 3 deposits on a recording medium 54 and forms a dot thereon. The toner particles are sequentially replenished to the ink outlet 52 by the electric field formed by the electrophoresis electrode 53.

As a result, a desired image is formed on the recording medium 54.

On the other hand, the auxiliary voltage Vs higher than the ejection voltage Vej forms electric fields between the ejection electrode 55A and the adjacent auxiliary electrodes 1A in directions indicated by arrows A in FIG. 7. Consequently, the toner particles migrate from the electrodes 1A toward the electrode 55A and collect densely at the electrode 55A. Therefore, even when a given electrode 55A is driven continuously, the toner particles can collect at the meniscus in a sufficient amount at all times. This insures the stable flight of the drops 3 from the tip of the electrode 55A.

Moreover, the tips of the auxiliary electrodes 1 are located at positions receded into the ink chamber 51 from the tips of the ejection electrodes 55, as stated earlier.

Therefore, despite the auxiliary voltage Vs applied to the electrodes 1A, accidental ink ejection from the electrodes 1A is obviated because convex meniscuses are absent on the imaginary extensions of the electrodes 1A.

Only if the auxiliary voltage Vs is of the same polarity as the charge of the toner particles, it is capable of preventing the toner particles from migrating from the ejection electrode 55A toward the adjacent auxiliary electrodes 1A. For example, so long as the voltage Vs does not cause the ink to fly, the tips of the auxiliary electrodes 1 may be aligned with the tips of the ejection electrodes 55.

In summary, it will be seen that the present invention provides an ink jet type head assembly having various unpecedented advantages, as enumerated below.

(1) Auxiliary electrodes alternate with ejection electrodes. A voltage of the same polarity as charge deposited on toner particles is applied to two auxiliary electrodes adjoining an ejection electrode which should eject ink. This successfully prevents the toner particles from migrating toward the auxiliary electrodes away from the ejection electrode.

(2) The tips of the auxiliary electrodes are located at positions receded into an ink chamber from the tips of the ejection electrodes. Therefore, despite the auxiliary voltage applied to the auxiliary electrodes, accidental ink ejection from the electrodes is obviated because convex meniscuses are absent on the imaginary extensions of the electrodes.

(3) The auxiliary voltage is higher than an ejection electrode. Consequently, the toner particles migrate from the auxiliary electrodes toward the ejection electrode and collect densely at the ejection electrode. Therefore, even when a given ejection electrode is driven continuously, the toner particles can collect at the meniscus in a sufficient amount at all times. This insures the stable flight of drops from the tip of the ejection electrode.

Various modifications will become possible for those skilled in the art after receiving the teachings of the present disclosure without departing from the scope thereof.

What is claimed is:

1. An ink jet type head assembly comprising:

an electrophoresis electrode and a counter electrode facing each other at a predetermined distance;

an ink chamber having an ink outlet facing said counter electrode, for forming ink meniscuses;

a plurality of parallel ejection electrodes having tips aligned in a lengthwise direction of said ink outlet, wherein said plurality of ejection electrodes each at least partly extends in a form of a stripe along a line connecting said electrophoresis electrode and said counter electrode; and a plurality of auxiliary electrodes alternating with said plurality of ejection electrodes.

2. An assembly as claimed in claim 1, wherein tips of said plurality of auxiliary electrodes are located at positions receded into said ink chamber from the tips of said plurality of parallel ejection electrodes.

3. An assembly as claimed in claim 2, further comprising a voltage drive section for selectively applying an ejection voltage to the ejection electrode which should eject ink, and applying an auxiliary voltage to the auxiliary electrodes adjoining said ejection electrode.

4. An assembly as claimed in claim 3, wherein said auxiliary voltage is selected to be higher than said ejection voltage.

* * * * *